US007546460B2

(12) United States Patent
Maes

(10) Patent No.: US 7,546,460 B2
(45) Date of Patent: Jun. 9, 2009

(54) SECURE COMMUNICATIONS ACROSS MULTIPLE PROTOCOLS

(75) Inventor: Stephane H. Maes, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 839 days.

(21) Appl. No.: 11/095,703

(22) Filed: Mar. 30, 2005

(65) Prior Publication Data

US 2006/0230266 A1    Oct. 12, 2006

(51) Int. Cl.
*H04L 9/00* (2006.01)
(52) U.S. Cl. .................. 713/168; 713/150; 713/153
(58) Field of Classification Search ................. 713/168, 713/150, 153
See application file for complete search history.

(56) References Cited

OTHER PUBLICATIONS http://digitalmedia.oreilly.com/pub/a/mac/2002/03/19/secure_mail.html, year 2002.*
Position Statement for Multimodal Workshop. Stéphane H. Maes., year 2004.*
Resume of Stephan Maes, year 2008.*
Evaluating delayed write in a multilevel caching file system; Muntz, D.A.; Honeyman, P.; Antonelli, C.J.; Distributed Platforms: Client/Server and Beyond: DCE, CORBA, ODP and Advanced Distributed Applications, Proceedings of the IFIP/IEEE International Conference on Feb. 27-Mar. 1, 1996 pp. 415-429.*
Using name-based mappings to increase hit rates Thaler, D.G.; Ravishankar, C.V.; Networking, IEEE/ACM Transactions on vol. 6, Issue 1, Feb. 1998 pp. 1-14.*
Middleware for Multimedia Streaming in a Heterogeneous Distributed Environment Sridhar, K.; Advanced Computing and Communications, 2006. ADCOM 2006. International Conference on Dec. 20-23, 2006 pp. 26-31.*
*What is IMAP?* The IMAP Connection http:/www.imap.org/about/whatisIMAP.html: Aug. 2, 2005.

* cited by examiner

*Primary Examiner*—David Y Jung
(74) *Attorney, Agent, or Firm*—Townsend and Townsend and Crew LLP

(57) ABSTRACT

Systems, methods, and devices for secure communications across multiple protocols are disclosed. In one embodiment, the method comprises receiving, at an access device, an encryption key. The access device analyzes the communication to determine a portion of the communication to be encrypted and to determine an additional portion of the communication to remain unencrypted by the first encryption process. The method further comprises encrypting the portion of the communication using the first encryption process and the encryption key, and transmitting the communication from the access device.

24 Claims, 6 Drawing Sheets

SECURE COMMUNICATIONS ACROSS MULTIPLE PROTOCOLS

BACKGROUND OF THE INVENTION

Users of wireless communications devices, such as mobile telephones, may send and receive a variety of different types of communications. When the user is communicating with servers outside the wireless network, the communications transmitted and received by wireless communication devices may need to be translated from one protocol to another. If the protocol translation takes place outside the control of either the sender or receiver, there may be a security problem, especially when firewalls are involved.

One type of communication that may be transmitted and received by wireless mobile communication devices is email. In a typical architecture, the email server may be an Internet Mail Access Protocol (IMAP) server coupled with the Internet. The email server may be connected via a connecter to a mobile email enabling server. The mobile email enabling server may transmit and receive emails from wireless communications devices using a mobile email protocol. Thus, the mobile email enabling server may be coupled with both the Internet and a wireless network. The mobile email enabling server may also use other protocols to communicate with mobile enablers that support functions such as outband notification, device provisioning, or other functions.

In order to satisfy security requirements, firewalls may exist between the connectors and the mobile email enabling server. Alternatively or additionally, firewalls may also exist between the wireless communication devices and the mobile email enabling server and/or the mobile enablers and mobile email enabling server. If the mobile email enabling server is not in either the wireless network operator's domain or the email service provider's domain, email messages are exposed outside the control of both parties during conversion between protocols and end-to-end security requirements are not satisfied.

BRIEF SUMMARY OF THE INVENTION

Systems, methods, and devices for secure communications across multiple protocols are disclosed. In one embodiment, the method comprises receiving an encryption key at an access device, such as a wireless communications device. By way of example, receiving the encryption key may comprise receiving device provisioning information at the access device and extracting the encryption key from the device provisioning information. The encryption key may also be received on other communication channels. The method further comprises analyzing the communication with the access device to determine a portion of the communication to encrypt using a first encryption process. An additional portion of the communication is also determined to remain unencrypted by the first encryption process. The portion of the communication is encrypted using the encryption key and the first encryption process. The communication is then transmitted from the access device. In further embodiments, the method may also include compressing the portion of the communication before transmitting the communication.

In one aspect, the portion to encrypt may be determined by determining a payload portion of the communication. In another aspect, the portion to encrypt may be determined by determining a message portion of the communication. In still a further aspect, the portion to encrypt may be determined by determining at least one argument included in the communication, the argument shared by a first protocol and a second protocol. In one embodiment, transmitting the communication may comprise transmitting an email which includes the encrypted portion and the additional portion. The encrypted portion includes a message portion of the email and the additional portion includes commands associated with a mobile email protocol.

In some instances, the method may further comprise receiving the communication from the access device at an intermediate server. The additional portion of the communication is converted, at the intermediate server, from a first protocol to a second protocol without decrypting the encrypted portion. By way of example, the communication may comprise an email and converting the second portion may comprise converting the second portion from a mobile email protocol to either an Internet Mail Access Protocol (IMAP) or Post Office Protocol (POP). The communication is then transmitted to an application server. The transmitted communication server includes the encrypted first portion and the converted second portion. In further embodiments, the method may also comprise receiving the communication at the application server and obtaining a decryption key. The application server then decrypts the first portion of the communication using the decryption key.

In other embodiments, the method may further comprise receiving an updated encryption key at the access device. The updated encryption key may be received on a different communication channel than a channel used to transmit encrypted communications. Alternatively, the updated encryption key may be received as part of an encrypted communication. A portion of a second communication is encrypted using the updated encryption key. The second communication is then transmitted from the access device. The second communication includes the encrypted first portion of the second communication and an additional portion of the second communication.

Alternatively or additionally, the method may further comprise receiving a second communication at the access device. A first portion of the second communication is decrypted using the encryption key.

In a second embodiment, a method is disclosed which comprises obtaining an encryption key at an application server. The communication is analyzed to determine a portion of the communication to encrypt using a first encryption process and to determine an additional portion to remain unencrypted by the first encryption process. The portion of the communication is encrypted using the encryption key and the first encryption process. The communication, including the first encrypted portion and a second portion is transmitted to the intermediate server.

In one aspect, obtaining the encryption key may comprise negotiating with the access device. In another aspect, the method may further comprise receiving, at the application server, a device capability communication including configuration information for the access device. In this aspect, obtaining the encryption key may comprise determining the encryption key based at least in part on information included in the device capability communication. In a third aspect, obtaining the encryption key may comprise determining the encryption key based at least in part on device setting information.

In a third embodiment, an access device (e.g., a mobile telephone) is disclosed which comprises an encryption key, logic, and a communication component. The logic is configured to analyze a communication to determine a portion of the communication to be encrypted using a first encryption process and to determine an additional portion of the communication to remain unencrypted by the first encryption process.

The logic is further configured to encrypt the portion using the encryption key and the first encryption process. The access device is to transmit the communication.

In a fourth embodiment, an application server is disclosed which comprises application logic and a communications interface. The application logic is configured to obtain an encryption key and to encrypt a portion of a communication using the encryption key and a first communications process. The communications interface is configured to transmit the communication to an intermediate server for forwarding to a destination access device. The transmitted communication includes the encrypted portion and an additional portion not encrypted by the first encryption process.

In some aspects, the application server may further comprise a data storage to store device setting information for the access device. In these aspects, the application logic is configured to obtain the encryption key by determining the key based at least in part on the device setting information.

In a fifth embodiment, a system is disclosed which comprises an access device, an intermediate server, and an application server. The access device is configured to encrypt a portion of a communication using a first encryption process and to transmit the communication (including the encrypted first portion and an additional portion) to an intermediate server. The intermediate server is communicatively coupled with the access device. The intermediate server is configured to convert the second portion from a first protocol to a second protocol and to transmit the converted communication to an application server. The application server is communicatively coupled with the intermediate server and is configured to decrypt the first portion of the communication.

A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. Merely by way of example, embodiments that are described for secure end-to-end communications transmitted and received by wireless communication devices may also be used by other types of access devices (which may be non wireless) used to access any type of network. In other instances, well-known structures and devices are shown in block diagram form.

Figure 1:
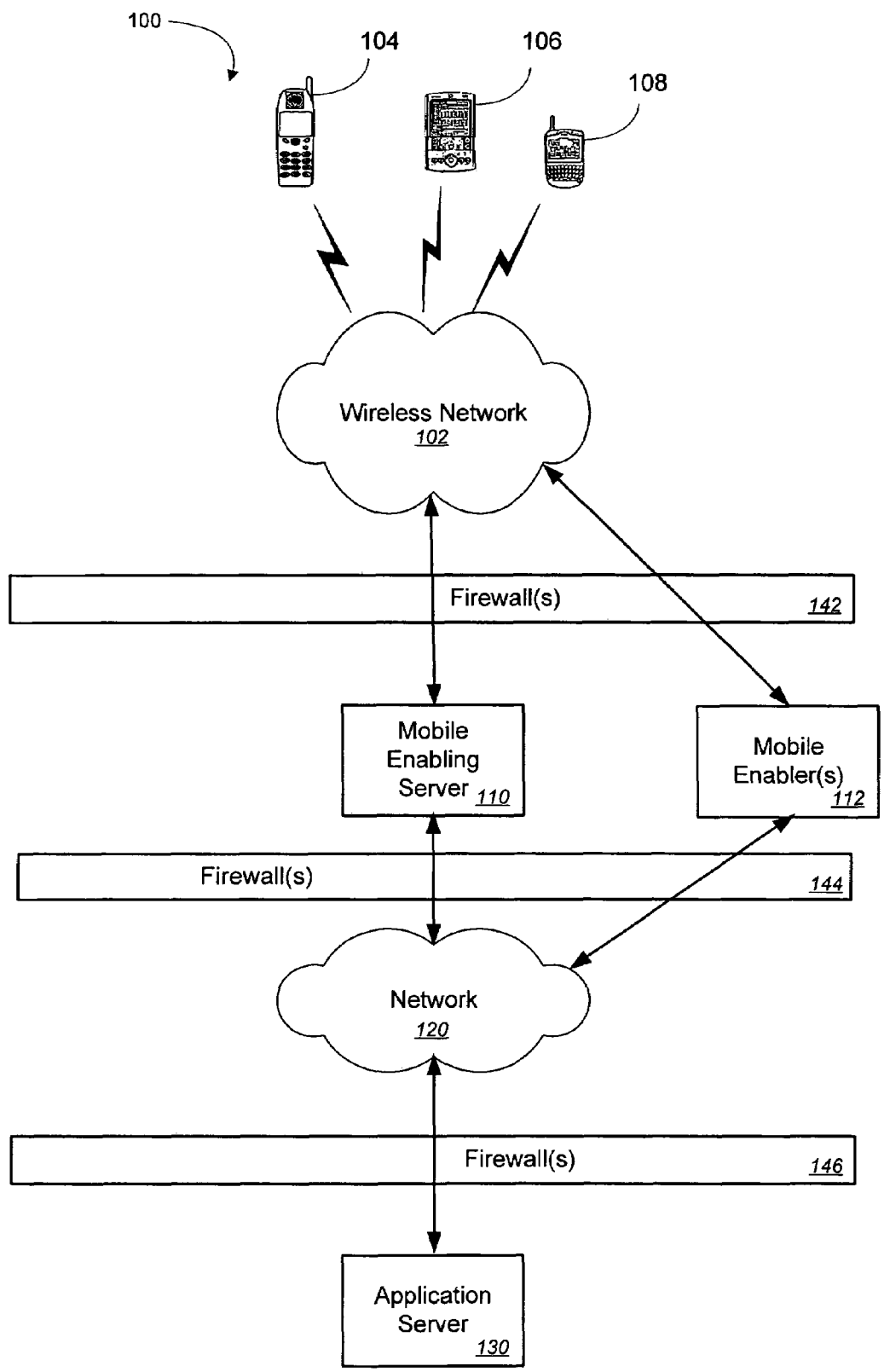
FIG. 1 illustrates a system that may use secure end-to-end communications according to one embodiment.

FIG. 1 illustrates an exemplary embodiment of a system that may use secure end-to-end mobile communications across multiple protocols. A number of wireless mobile devices 104, 106, 108 are communicatively coupled to wireless network 102. Wireless mobile devices 106, 108, 110 may be mobile telephones, personal data assistants (PDA) with wireless capabilities, laptops with wireless capabilities, wireless devices for receiving email communications (e.g., Blackberry® devices), or other types of wireless device It should be appreciated that wireless network 102 may also have additional wireless mobile devices (not shown) connected thereto Wireless network 102 employs a communication protocol for communications on the network 102. By way of example, the communication protocol may be Code Division Multiple Access (CDMA), Time Division Multiple Access (TDMA), Global System for Mobile Communication (GSM), WiFi (IEEE 802.11), General Packet Radio Service (GPRS), and other wireless network technologies. In addition to the communication protocol employed by the wireless network 102, wireless network 102 may also employ proprietary standards for communications. In some embodiments, wireless network 102 may further be coupled with additional wireless networks (not shown).

A number of different types of mobile enablers, such as mobile enabling server 110, and one or more additional mobile enabler(s) 112 (e.g., mobile enablers used to send SMS or other types of messages, device provisioning enablers, etc.) may also be coupled with wireless network 102. Mobile enabling server 110 may be used to expose an application service provided by application server 130 to wireless communication devices 104, 106, 108 communicating on wireless network 102. As will be described in further detail below, mobile enabling server 110 may be responsible for translating communications between protocols used by wireless devices 104, 106, 108 and protocols used by application server 130. Mobile enabler(s) 112 may be used to expose capabilities of wireless network 102 to application server 130 and/or other servers (not shown) communicating on network 120. These capabilities may include outband notifications (e.g., email notifications), device provisioning, device management, device information, call control, device location information, device presence information, voice chat, push to talk over cellular, different forms of messaging (e.g., Multi-Media Messaging Service (MMS), Short Messaging Service (SMS), instant messaging (IM), email, fax, etc.), Digital Rights Management (DRM), Internet browsing, content download, data synchronization, or other types of capabilities available on wireless network 102.

Mobile enabling server 110, and possibly other mobile enabler(s) 112, may communicate with application server 130 and/or other servers (not shown) communicating on network 120. Network 120 may be a wide area network such as the Internet, a Virtual Private Network (VPN), a local area network (LAN), or other type of network that may be used to communicate with application server 130. In some embodiments, the interfaces to mobile enabling server 110, and/or other mobile enabler(s) 112 may be deployed as web service interfaces. Enablers 110, 112 may also communicate with each other over network 116. Alternatively, enablers 110, 112 may communicate with each other over wireless network 102.

Application server 130 includes an application that provides a service to clients. By way of example, application server 130 may include an email server application, a database application, a calendar application, an address application, a voice over IP application or other type of application. Application server 130 may provide its services to users of wireless communications devices 104, 106, 108 by communicating with mobile enabling server 110. In some instances, other components (not illustrated) may be used to connect application server 130 with mobile enabling server 110.

Firewalls 142, 144, 146 may exist at various locations in system 100. One or more firewall(s) 142 may exist between enablers 110, 112 and wireless network 102. One or more firewall(s) 144 may also exist between one or more of the enablers 110, 112 and network 120. Additionally, firewall(s) 146 may exist between application server 130 and network 120. It should be appreciated that in alternative embodiments, system 200 may not include all of the firewalls 142, 144, 146 illustrated in FIG. 1.

Mobile enabling server 110 may need to convert communications that are sent to/from wireless communications devices 104, 106, 108 from/to application server 130 between different protocols. In order to prevent communications from being in the clear while the protocol conversion takes place, applications executing on application server 130 and wireless communication devices 104, 106, 108 may encrypt the payload or message portion of a communication before transmitting a communication. Common arguments used by both the protocol used by wireless communication devices 104, 106, 108 and application server 130 may also be encrypted. Another portion of the communication may remain unencrypted so that it may be converted to the protocol used by the application server. In some embodiments, the message/payload and/or common arguments of a communication may also be compressed before encryption. Thus, the message/payload portion of the communication may remain encrypted when mobile email enabling server 110 converts the unencrypted portion between protocols and end-to-end security of communications sent between application server 130 and wireless communications devices 104, 106, 108 may be achieved.

It should be appreciated that numerous variations may be made to the system illustrated in FIG. 1. For instances, the system may not include all of the components or may include additional components. As another example, other types of access devices communicating on different types of networks may also use secure end to end communications across multiple protocols. Other variations are also contemplated.

Figure 2:
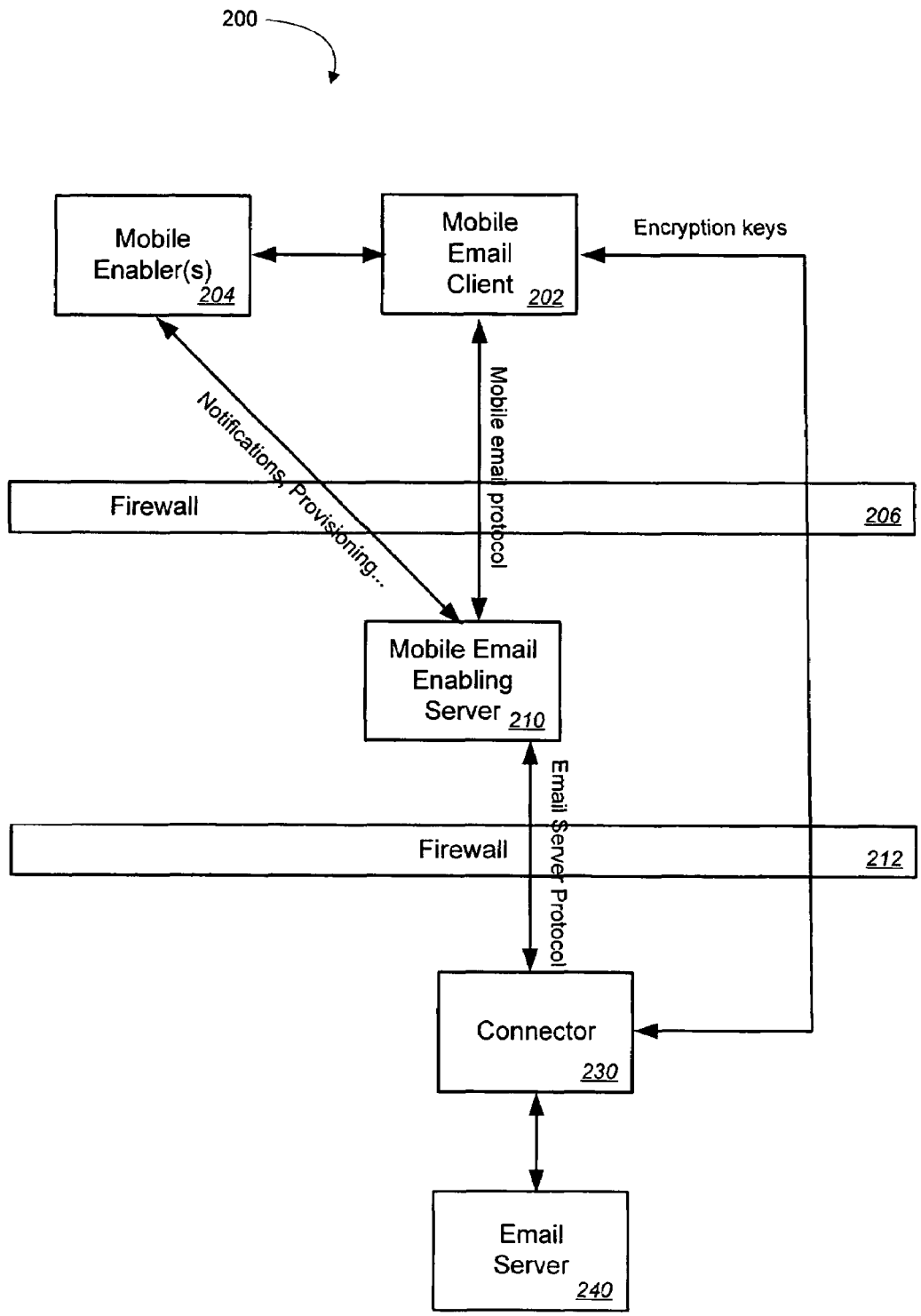
FIG. 2 illustrates an exemplary embodiment of an email system that may use secure end-to-end communications across multiple protocols.

FIG. 2 illustrates an exemplary embodiment of an email system 200 that may use secure end-to-end communications across multiple protocols. The system 200 includes a mobile email client 202. Mobile email client may be an email application executing on a wireless communications device, such as a mobile telephone, personal data assistant (PDA) or laptop, or other wireless communication device executing an email client application to send and receive email communications.

Mobile email client 202 is communicatively coupled with mobile enabling server 210. Mobile email enabling server 210 may enable email server 240 to provide email services to mobile email client 202. In some embodiments, one or more firewall(s) 206 may exist between mobile email enabling server 210 and mobile email client 202.

Mobile email client 202 and mobile email enabling server 210 may also be communicatively coupled with one or more mobile enabler(s) 204. Mobile enabler(s) 204 may expose wireless network capabilities, such as outband notifications, device provisioning, device management, or other type of capability previously described. One or more firewall(s) 206 may also exist between mobile email enabling server 210 and mobile enabler(s) 204. Although not illustrated, firewall(s) may also exist between mobile enabler(s) 204 and mobile email client 202.

Email server 240 is used to provide email services to mobile email client 202 and other clients. In some aspects, email server 240 may be coupled with mobile email enabling server 210 through a connector (e.g., web services connector) 230. Connector 230 may be located on the same server as email server 240 or a different server that is within the domain of trust of email server 240. As will be described in further detail below, connector 230 may encrypt, decrypt, and/or compress portions of communications transmitted and received by email server 240. In other embodiments, connector 230 may not be included. Instead, the encryption/decryption and/or compression may be performed by email server 240. Email server 240 may also communicate with mobile enabler(s) 204 to perform device provisioning, to perform device management, and/or to obtain device capabilities.

Email server 240 employs a first protocol for email communications. By way of example, email server 240 may use Internet Mail Access Protocol (IMAP), any version of Post Office Protocol (POP), or other type of email protocol that may be used on a network 120. Mobile email client 202 employs a mobile email protocol for email communication. Thus, mobile email enabling server 210 may translate email communications between the email server protocol used by email server 240 and the mobile email protocol used by mobile email client 202. Mobile email enabling server 210 may use a different protocol (e.g., web services) to communicate with mobile enabler(s) 204 to perform outband notifications to mobile email client 202, to perform device provisioning/management of mobile email client 202, and/or to use other capabilities exposed by mobile enabler(s) 204.

As will be described in further detail below, mobile email client 108 may include logic to encrypt the message portion of the email before transmitting the email communication. Mobile email client 108 may also compress the message portion of the email before it is encrypted. In some instances, mobile email client 108 may also encrypt (and possibly compress) common arguments used by both the mobile email protocol and the email server protocol used by email server 240. The message and/or common arguments may be encrypted by mobile email client 202 using an encryption key that may then be decrypted by email server 240 using a paired key. An additional portion of the email (e.g., commands that are converted by mobile enabling server) remains unencrypted by the encryption process used to encrypt the message portion.

In some embodiments, the encryption key may be provisioned by connector 230 using a mobile enabler, such as a device provisioning enabler 204. The encryption key may be updated by connector 230 using a device management enabler 204. Alternatively, connector 230 may negotiate the encryption key with the client. Key negotiation communications may go through mobile email enabling server 210 or through a separate communication channel. Other techniques, some of which will be described below, may also be used to provide an encryption key to the wireless communications device associated with mobile email client 202 with an encryption key (e.g., encryption key may be negotiated/obtained/provisioned by email server 240).

Connector 230 also encrypts (and possibly compresses) the message portion of email communications before transmittal to mobile email client 202. Connector 230 may keep track of the encryption key paired with the mobile email client's decryption key, may perform key negotiation to obtain key information, may extract key information from a device capability communication, or may use another appropriate technique to determine which key to use to encrypt communications sent to mobile email client 202. It should be appreciated that a decryption key may be provided to mobile email client 202 using any of the techniques described above. Thus, emails transmitted from email server 240 via connector 230 may be decrypted by mobile email client 202.

Figure 3:
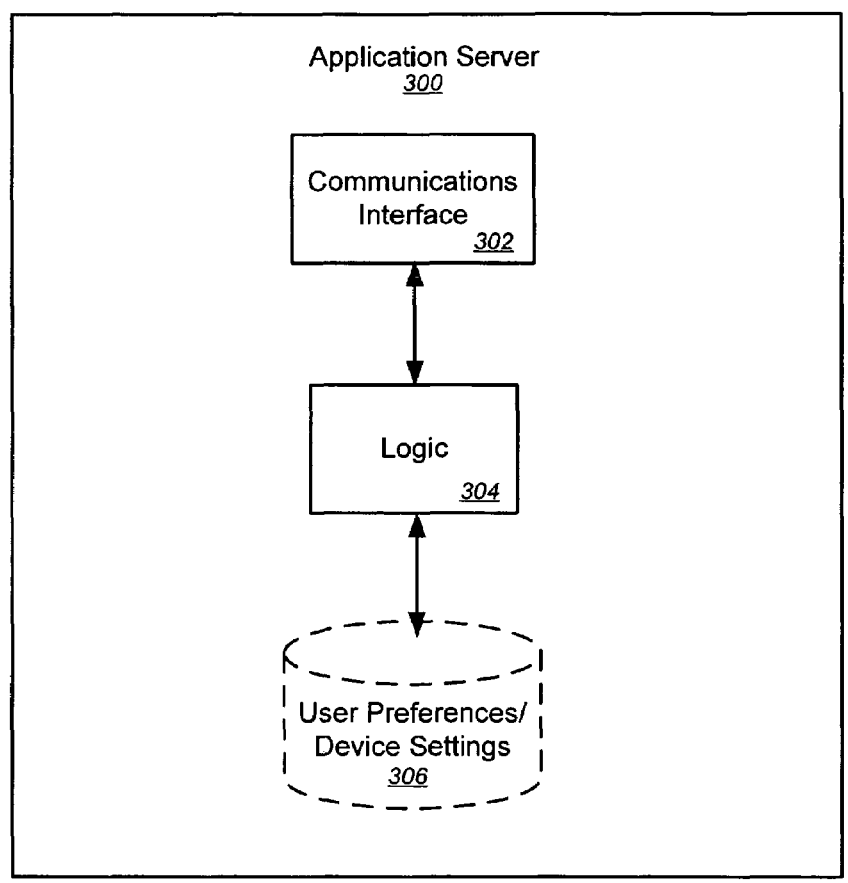
FIG. 3 is a block diagram of exemplary components of an application server.

FIG. 3 illustrates an exemplary block diagram of components of an application server 300. Application server 300 may include logic 304 communicatively coupled with communications interface 302 and data storage 306. The communicative couplings between logic 304 and communications interface 302 and between logic 304 and data storage 306 may be by means of a bus, cable, network, program code call (e.g., modular or procedural call) or other mechanism that allows communication between the components. Thus, it should be appreciated that the components 302, 304, 306 may reside on the same or different physical devices.

Communications interfaces 302 may be used to send and receive communications to/from wireless communications devices via a mobile enabling server or to/from other types of access devices. In some embodiments, communications interface 302 may include an interface to a wide area network (WAN), such as the Internet, or proprietary networks. Alternative or additional types of interfaces may also be included as components of communications interface 502.

Logic 304 may be one or more software programs, one or more components of a software program (e.g., function or program object), firmware, or other type of machine-executable instructions. Logic 304 may include application logic for an application executing on application server. By way of example, application logic may include an email server application program, calendaring program, address book program, database program, voice over IP application service, or other type of application service provided to clients of application server 300. Logic 304 may also include logic (e.g., connector logic) to encrypt and decrypt the message/payload portions of communications transmitted to wireless communication devices without encrypting additional portions of the communications that are converted to a different protocol. Additionally, logic 304 may encrypt and decrypt common arguments shared by both a protocol used by application logic and a protocol used by client applications residing on wireless communication devices. In one embodiment, the application logic may perform the encryption, decryption, compression, and decompression either by taking advantage of inherent features in the protocol used by the application or by performing content adaptation to encrypt/decrypt (and in some cases compress/decompress) the message/payload portions of communications.

In some instances, logic 304 may also be used to provision wireless communications devices (or other types of access devices) with encryption keys. Logic 304 may also update encryption keys used by clients. For example, logic 304 may update encryption keys by using a device management enabler to transmit configuration files with encryption keys to wireless communication devices. Alternatively, logic 304 may update keys on wireless communication devices by sending communications (encrypted with current keys) that contain the new key information to wireless communications device. In other embodiments, keys may be negotiated by logic 304 and wireless communication devices or keys may be provisioned/updated by components other than application server 300.

Data storage 306 may be an object database, a relational database, a spreadsheet, a text file, internal software lists, or other type of data structure suitable for storing data. Data storage 306 may store key information for wireless communication devices. Logic 304 may retrieve the key information when encrypting/decrypting communications.

Alternatively or additionally, data storage 306 may be used to store device setting information for wireless communication devices. The device setting information may have been obtained from device capability communications that include configuration information for wireless communication devices. By way of example, a device capability communication may be a UAprof (User Agent profile), a CC/PP (Component Capabilities/Preference Profiles), CONNEG (content negotiation), or other type of communication specifying device capabilities. In these embodiments, logic 304 may retrieve device setting information from data storage 306. The device setting information may include information about the encryption key(s) and/or decryption key(S) associated with the device. Merely by way of example, UAprof may provide parameters used to compute the encryption key based on information stored in the device repository. Thus, the device setting information may then be used by logic 304 to determine encryption/decryption keys to use to encrypt/decrypt the designated portions of communications. Other techniques may also be used by logic 304 to obtain keys used to encrypt/decrypt designated portions of communications.

It should be appreciated that in alternative embodiments, application server 300 may include additional, fewer, or alternative components than illustrated in FIG. 3. For example, in some embodiments, application server may not include data storage 306. Other variations are also contemplated.

Figure 4:
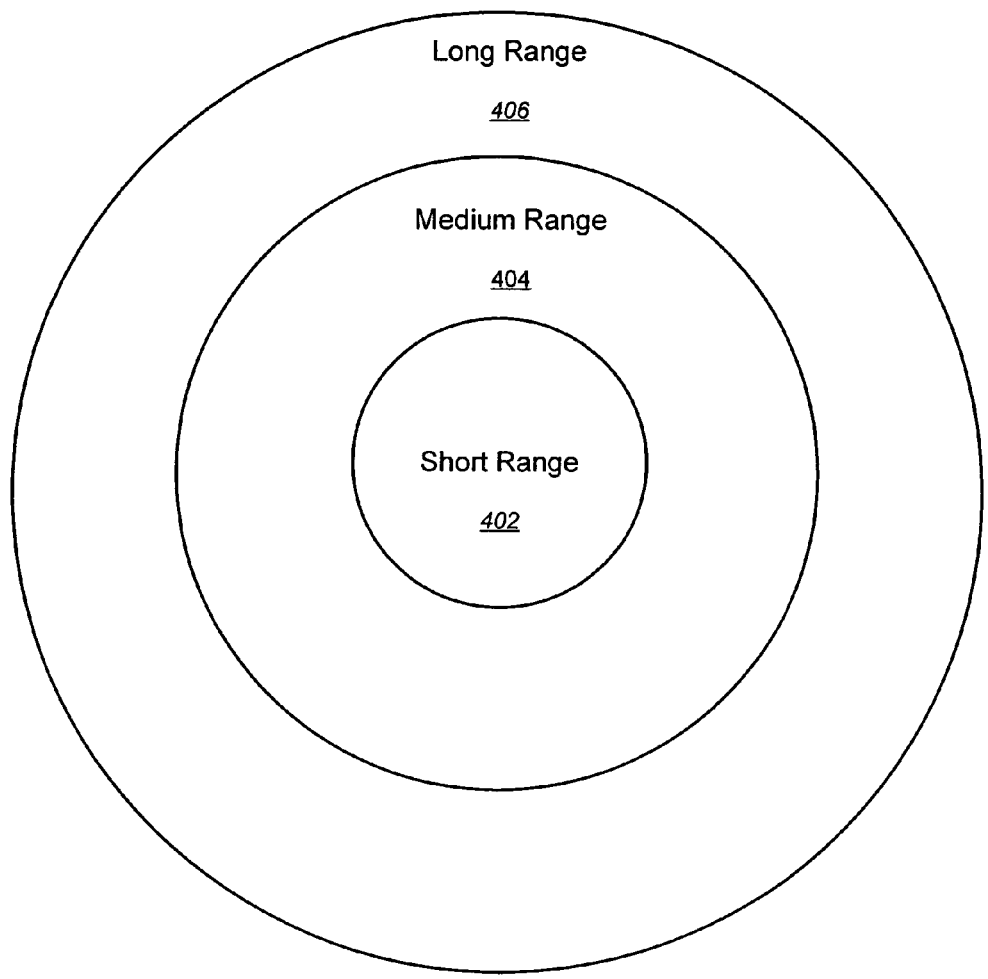
FIG. 4 illustrates a simplified comparison of network technologies.

FIG. 4 illustrates a simplified comparison of wireless network technologies which may use device billing agents. Wireless network technologies include long range networks 406, medium range networks 404, and short range networks 402.

Long range networks 406 may be referred to as wireless wide area networks (WWAN). WWAN networks are high power networks that typically have an access range on the order of several kilometers or more. WWAN technologies include cellular and related technologies such as GSM (Global System for Mobile Communications), GPRS (General Packet Radio Service), CDMA (Code Division Multiple Access), CDPD (Cellular Digital Packet Data), TDMA (Time Division Multiple Access), WCDMA (Wideband Code Division Multiple Access), and other similar types of technologies.

Medium range networks 404, also referred to as wireless local area networks (WLAN), are medium power networks that typically have an access range on the order of tens of meters. Exemplary WLAN technologies include the IEEE 802.11(a), (b), (e) and (g) technologies. Short range networks 402, also known as wireless personal area networks (WPAN), are typically low power networks that have an access range of about 10 meters or less. Examples of WPAN technologies include Bluetooth, HomeRF, IRDA and IEEE 802.15 technologies. It should be appreciated that networks, other than wireless networks, may be made accessible to a user via an access provider.

Figure 5:
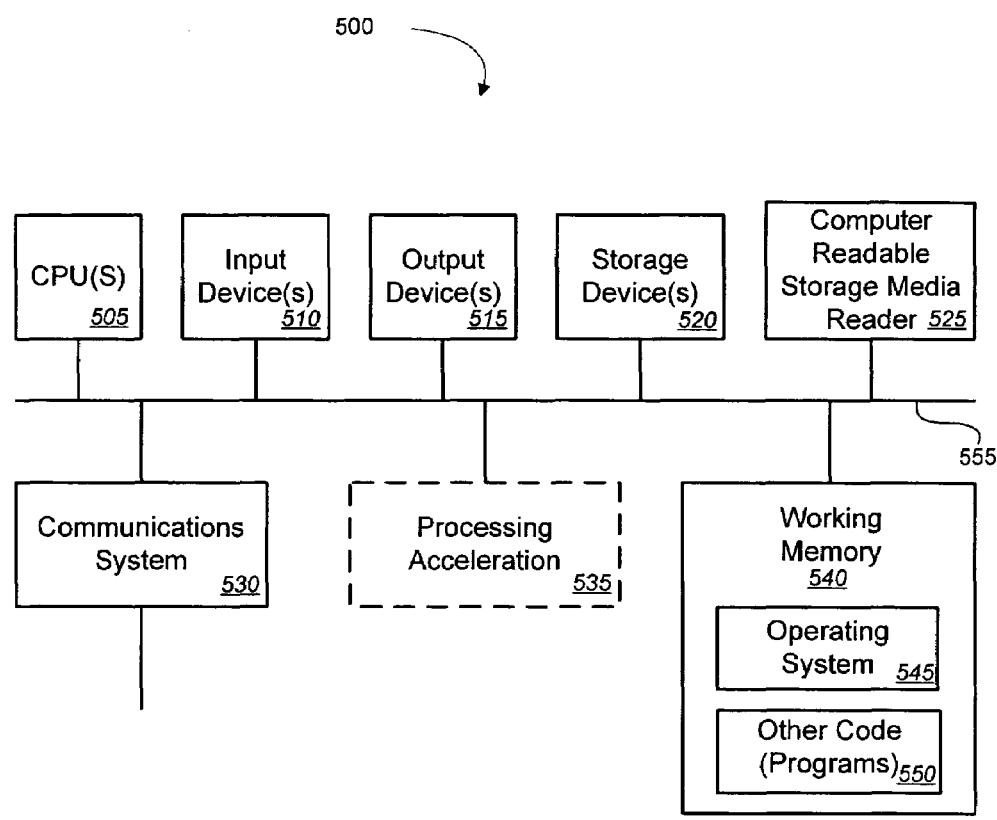
FIG. 5 is a block diagram of a computer system upon which an application server may be implemented.

FIG. 5 illustrates one embodiment of a computer system 500 upon which an application server, such as an email server, may be implemented. The computer system 500 is shown comprising hardware elements that may be electrically coupled via a bus 555. The hardware elements may include one or more central processing units (CPUs) 505; one or more input devices 510 (e.g., a mouse, a keyboard, etc.); and one or more output devices 515 (e.g., a display device, a printer, etc.). The computer system 500 may also include one or more storage device 520. By way of example, storage device(s) 520 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 525; a communications system 530 (e.g., a modem, a network card (wireless or wired), an infra-red communication device, etc.); and working memory 540, which may include RAM and ROM devices as described above. In some embodiments, the computer system 500 may also include a processing acceleration unit 535, which can include a DSP, a special-purpose processor and/or the like The computer-readable storage media reader 525 can further be connected to a computer-readable storage medium, together (and, optionally, in combination with storage device (s) 520) comprehensively representing remote, local, fixed, and/or removable storage devices plus storage media for temporarily and/or more permanently containing computer-readable information. The communications system 530 may permit data to be exchanged with a network and/or any other computer or wireless device.

The computer system 500 may also comprise software elements, shown as being currently located within a working memory 540, including an operating system 545 and/or other code 550, such as an application program. The application programs may implement an email system or other type of application service. It should be appreciate that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Figure 6:
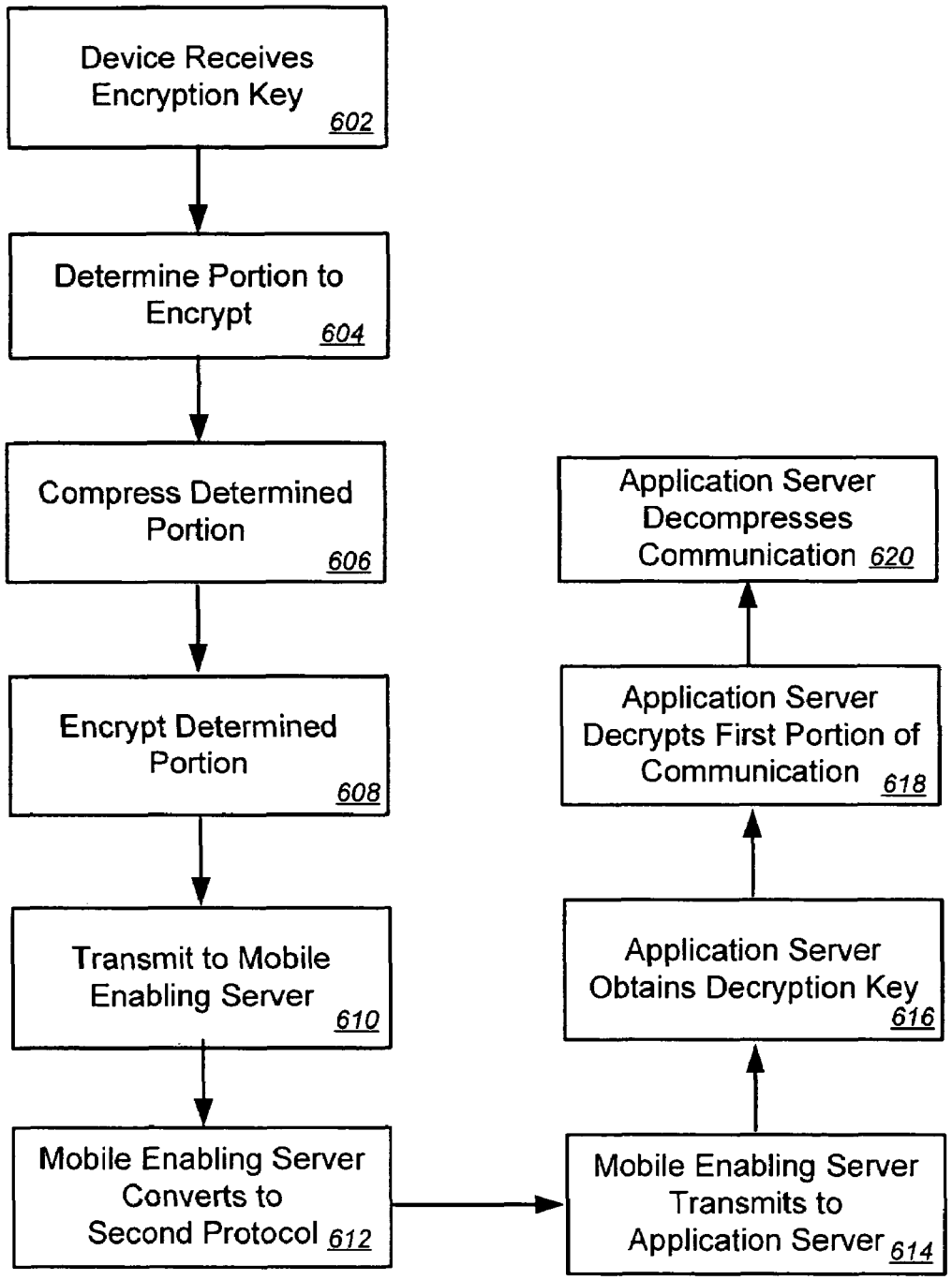
FIG. 6 is a flow diagram illustrating an exemplary method that may be used to transmit a communication from a wireless communications device to an application server with end-to-end security.

FIG. 6 illustrates an exemplary method that may be used to transmit a communication from an access device (e.g., a wireless communications device) to an application server. The access device receives 602 an encryption key. Encryption keys may be received 602 by access device in a variety of different ways. For example, the device may receive a device provisioning file (e.g., an XML configuration file) and may extract the encryption key from the file. As another example, an encryption key 602 may have been received during key negotiations with an application server. In some cases, the received 602 encryption key may be an updated encryption key received as part of device management. Alternatively, the encryption key may be an updated encryption key received 602 in a communication transmitted from the application server (which may have been encrypted using the previous keys). Other methods may also be used to provide keys to access device.

The access device may then analyze the communication to determine 604 a portion of the communication to encrypt and a portion to remain unencrypted by a first encryption process. The determined 604 portion to encrypt may include a message or payload portion of the communication. By way of example, the message/payload portion may be a message portion of an email, the payload portion of a data synchronization message (e.g., calendaring synchronization), a calendar entry, an address book entry, or other payload or message component portion of a communication transmitted to application server. In some instances, the determined 604 portion to encrypt may also include common arguments shared by the protocol used by client application logic executing on wireless communication device and the protocol used by the application executing on application server. Optionally, the determined 604 portion to encrypt may also be compressed 606. The portion to remain unencrypted may include commands that are converted from a first communication protocol to a second communication protocol by an intermediate server.

Access device then encrypts 608 the determined portion of the communication using the received 602 encryption key and a first encryption process. In one embodiment, the compression 606 and/or encryption 608 may be performed by client application logic residing on the access device. The communication protocol used by the client application may support compression and decryption of the determined 604 portion. Alternatively, the client application may include content adaptation logic to perform encryption 608 (and in some instances, compression 606) of designated portions of the communication.

A communication component of access device may then be used to transmit 610 the communication to an intermediate server, such as a mobile enabling server, for protocol conversion. The transmitted 610 communication includes the encrypted portion and the additional portion which was not encrypted by the first encryption process that encrypted the encrypted portion. The additional portion may include arguments that need to be converted to a protocol used by the application residing on application server. It should be appreciated that in some aspects an additional encryption process may be performed to encrypt the entire communication before transmittal to the intermediate server.

The intermediate server (e.g., mobile enabling server) converts 612 the additional portion of the communication from a first protocol used by client application on wireless communications device and a second protocol used by application on application server. The conversion is performed by the intermediate server without decrypting the portion of the communication encrypted by the first encryption process. For example, the transmitted 610 communication may be an email and the mobile enabling server may convert 612 the email from a mobile email protocol to an IMAP or POP protocol. Since the message or payload portion of the communication does not need to be converted, the first portion of the communication may remain encrypted during the conversion 612.

The converted communication may then be transmitted 614 by mobile enabling server to the application server. The application server obtains 616 the key needed to decrypt the first portion of the communication. As previously described, application server may obtain 616 the decryption key based on stored key information associated with access device, based on device setting information, based on negotiations with access device, or other manner. The application server may then decrypt 618 the encrypted portion of the communication using the obtained 616 decryption key. If compression was also used, application server may also decompress 620 the communication. The application server may then process the communication received from access device.

In the illustrative embodiment of FIG. 6, a method was described for transmitting a communication from an access device to an application server. It should be appreciated that communications transmitted from application servers to access devices may also be encrypted using a similar process. Thus, an application server may transmit a message to an access device that includes a portion encrypted by a first encryption process (e.g., message portion, payload portion, commands common to both protocols) and a portion that remains unencrypted by the first encryption process (e.g., portion that includes commands to be converted). An intermediate server may then convert the unencrypted portion to a second protocol without decrypting the encrypted portion. The access device may then decrypt the communication using the appropriate decryption key (e.g., decryption key associated with the application server).

In some embodiments, encryption keys may be updated. Encryption keys may be updated on a periodic basis, upon request, upon occurrence of an event, or at another appropriate time. Encryption keys may be updated using a different communications channel than the communications in which the communications transmitted/received to/from an access device. Alternatively, the encryption keys may be sent using the same communication channel. By way of example, the key may be encrypted in a message portion of a communication transmitted using a prior encryption key.

In some aspects, the communication channel used to transmit the encryption keys may not have guaranteed delivery (e.g., a notification channel). In these aspects, communications encrypted using the old encryption key may be accepted until a communication is received using the new encryption key. At that point, communications with the old encryption key may no longer be accepted.

An example illustration of communication exchange between an access device and an application server will now be described. The illustration is intended to merely be exemplary in nature only, and numerous variations (such as any of those previously described or other suitable variations) are contemplated. The access device may register itself with an application server by sending a communication, such as a HELLO message. The device ID may be transmitted in plain text (unencrypted) and a payload portion of the communication may be encrypted using an encryption key associated with the destination application server. The encryption key associated with the server may have been obtained during a device provisioning process, prior key negotiation process, or other suitable process. The payload portion may include the device ID which has been encrypted using the encryption key associated with the application server. In some aspects, the payload portion may also include other information that the device is sending to the application server (e.g., network characteristics of the device, etc.).

After receiving the HELLO communication, the application server may look up the encryption key associated with the access device (e.g., retrieve information from a data storage to determine an associated encryption key). If the encryption key does not exist or otherwise cannot be determined, an invalid encryption key communication may be sent to the Notification Processor in plain (unencrypted text). Otherwise, the application server may then decrypt the payload using the key (e.g., using 64 bit Advanced Encryption Standard, 64-bit Triple-DES algorithms, or other suitable algorithm) and compare the device id portion of the payload to the unencrypted device id. If they match, the application server may then retrieve information it has on the access device and send the OK response to the access device client.

The application server may use the same, or different, encryption key to encrypt portions of a communication transmitted from the application server to the access device. In some aspects, the application server may first generate a unique sequence number that is transmitted in plain text (unencrypted). The same sequence number may also be included in the encrypted payload portion. Thus, the access device may compare the sequence numbers to verify the communication from the application server.

It should be appreciated that in alternative embodiments, a communication exchange from an access device to an application server (or visa versa) may occur in a manner differently than described above. It should also be appreciated that the methods and systems described above to transmit secure end-to-end communications may be used in numerous other types of embodiments In the foregoing description, for the purposes of illustration, methods were described in a particular order. It should be appreciated that in alternate embodiments, the methods may be performed in a different order than that described. Additionally, the methods may include fewer, additional, or different blocks than those described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing secure communications across multiple protocols, comprising:
    analyzing, using an access device, a communication to be transmitted to a destination using a first protocol to determine a first portion of the communication to encrypt using a first encryption process and to determine an additional portion of the communication to remain unencrypted by the first encryption process;
    encrypting, using the access device, the first portion of the communication using the first encryption process and a determined encryption key; and
    after the encrypting, transmitting the communication from the access device to the destination using the first protocol, the communication including the encrypted first portion and the additional portion unencrypted by the first encryption process,
    wherein an intermediate component between the access device and the destination is able to convert the unencrypted additional portion from a first protocol to a second protocol, without decrypting the first portion, and transmit the communication to the destination using the second protocol.

2. The method of claim 1, wherein determining the first portion comprises determining a payload portion of the communication.

3. The method of claim 1, wherein determining the first portion comprises determining a message portion of the communication.

4. The method of claim 1, wherein determining the first portion comprises determining at least one argument included in the communication, the argument shared by the first protocol and the second protocol.

5. The method of claim 1, wherein transmitting the communication comprises transmitting an email communication, the first portion including a message portion of the email communication and the additional portion including commands associated with a mobile email protocol.

6. The method of claim 1, further comprising, before transmitting the communication, compressing the first portion of the communication.

7. The method of claim 1, further comprising:
receiving, with the access device, device provisioning information; and
extracting the encryption key from the device provisioning information.

8. The method of claim 1, further comprising:
receiving the communication from the access device at an intermediate server;
converting, at the intermediate server, the additional portion of the communication from the first protocol to the second protocol without decrypting the first portion; and
after the converting, transmitting the communication from the intermediate server to the destination,
wherein the destination is an application server.

9. The method of claim 8, wherein the communication comprises an email, and wherein converting the additional portion comprises converting the additional portion from a mobile email protocol to one of Internet Mail Access Protocol (IMAP) or Post Office Protocol (POP).

10. The method of claim 8, further comprising:
receiving the communication at the application server;
obtaining a decryption key; and
decrypting, at the application server, the portion of the communication using the decryption key.

11. The method of claim 1, further comprising:
receiving, at the access device, an updated encryption key;
encrypting, at the access device, a portion of a second communication using the updated encryption key; and
after the encrypting, transmitting the second communication from the access device, the second communication including the encrypted portion and an additional portion of the second communication.

12. The method of claim 11, wherein transmitting the second communication comprises transmitting the second communication on a first communication channel and wherein receiving the updated encryption key comprises receiving the encryption key on a second communication channel.

13. The method of claim 11, wherein receiving the updated encryption key comprises receiving an encrypted communication including the updated encryption key.

14. The method of claim 1, further comprising:
receiving a second communication at the access device; and
decrypting a first portion of the second communication using the encryption key.

15. A method of providing secure communications across multiple protocols, comprising:
analyzing, using an application server, a communication to be transmitted using a first protocol to determine a portion of the communication to encrypt using a first encryption process and to determine an additional portion to remain unencrypted by the first encryption process;
encrypting, using the encryption key and the first encryption process at the application server, the first portion of the communication to be transmitted to an access device via an intermediate server; and
after the encrypting, transmitting the communication to the intermediate server using the first protocol, the communication including the encrypted first portion and the additional portion unencrypted by the first encryption process,
wherein the intermediate server is able to convert the unencrypted additional portion from a first protocol to a second protocol, without decrypting the first portion, and transmit the communication to the access device using the second protocol.

16. The method of claim 15, further comprising:
obtaining the encryption key by negotiating with the access device.

17. The method of claim 15, further comprising:
receiving, at the application server, a device capability communication, the device capability communication including configuration information for the access device; and
wherein the encryption key is obtained by determining the encryption key based at least in part on information included in the device capability communication.

18. The method of claim 15, wherein the encryption key is obtained by determining the encryption key based at least in part on device setting information.

19. An access device for sending and receiving communications across multiple protocols, comprising:
a processor;
memory for storing an encryption key and instructions that, when executed by the processor, provide logic for analyzing a communication to determine a first portion of the communication to be encrypted using a first encryption process, to determine an additional portion of the communication to remain unencrypted by the first encryption process, the instructions when executed further providing logic for encrypting the first portion using the encryption key and the first encryption process; and
a communication component to transmit the communication to a destination using a first protocol, the communication including the encrypted first portion and the additional portion unencrypted by the first encryption process,
wherein an intermediate component between the access device and the destination is able to convert the unencrypted additional portion from a first protocol to a second protocol, without decrypting the first portion, and transmit the communication to the destination using the second protocol.

20. The access device of claim 19, wherein the access device comprises a wireless device.

21. The access device of claim 20, wherein the wireless device comprises a mobile telephone.

22. An application server, comprising:
a processor;
memory storing instructions that, when executed by the processor, provide application logic to obtain an encryption key and to encrypt a first portion of a communication using the encryption key and a first encryption process; and
a communications interface operable to transmit the communication to an intermediate server using a first protocol for forwarding to a destination access device, the communication including the encrypted first portion and an additional portion not encrypted by the first encryption process,
wherein the intermediate server is able to convert the unencrypted additional portion from a first protocol to a second protocol, without decrypting the first portion, and transmit the communication to the destination access device using the second protocol.

23. The application server of claim 22, further comprising a data storage to store device setting information for the access device and wherein the application logic is configured to obtain the encryption key by determining the encryption key based at least in part on the device setting information.

24. A system of providing secure communications across multiple protocols, comprising:

an access device operable to encrypt a first portion of a communication using a first encryption process and to transmit the communication to an intermediate server using a first protocol, the communication including the encrypted first portion and an additional portion not encrypted by the first encryption process;

the intermediate server, communicatively coupled with the access device, operable to convert the additional portion from first protocol to a second protocol and to transmit the converted communication to an application server using the second protocol; and the application server, communicatively coupled with the intermediate server, the application server configured to receive the communication in the second protocol and decrypt the encrypted portion of the communication.

* * * * *

UNITED STATES PATENT AND TRADEMARK OFFICE
CERTIFICATE OF CORRECTION

PATENT NO. : 7,546,460 B2  Page 1 of 1
APPLICATION NO. : 11/095703
DATED : June 9, 2009
INVENTOR(S) : Stephane H. Maes It is certified that error appears in the above-identified patent and that said Letters Patent is hereby corrected as shown below:

In column 4, line 14, after "thereto" insert -- . --.

In column 8, line 54, delete "IRDA" and insert -- IrDA --, therefor.

In column 9, line 13, after "like" insert -- . --.

In column 12, line 3, after "embodiments" insert -- . --.

In column 16, line 1, in claim 24, after "from" insert -- the --.

Signed and Sealed this

First Day of June, 2010

David J. Kappos
*Director of the United States Patent and Trademark Office*